W. LANGE.
STONE WASHER AND SEPARATOR.
APPLICATION FILED APR. 4, 1913.
1,079,132.
Patented Nov. 18, 1913.
4 SHEETS—SHEET 4.
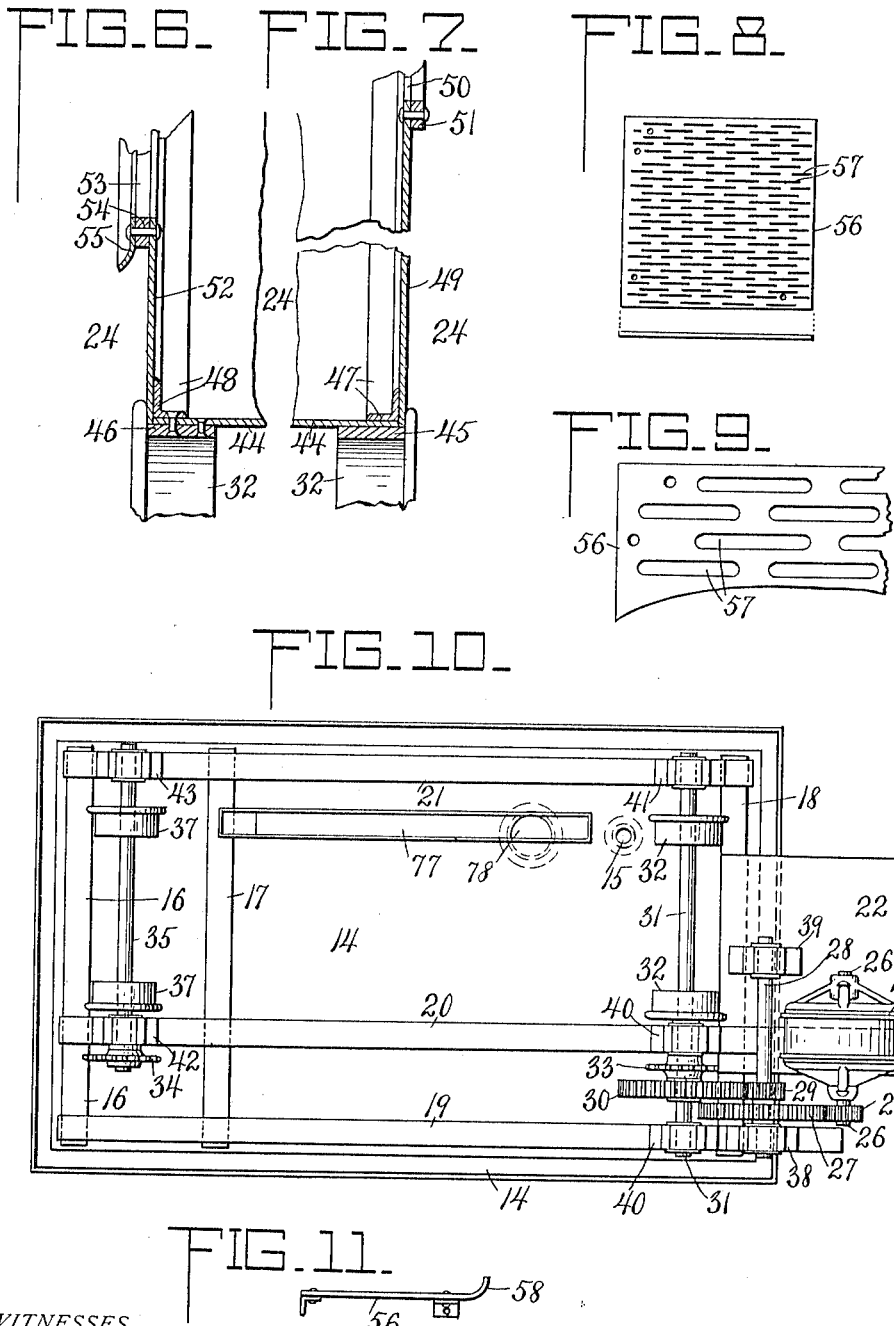

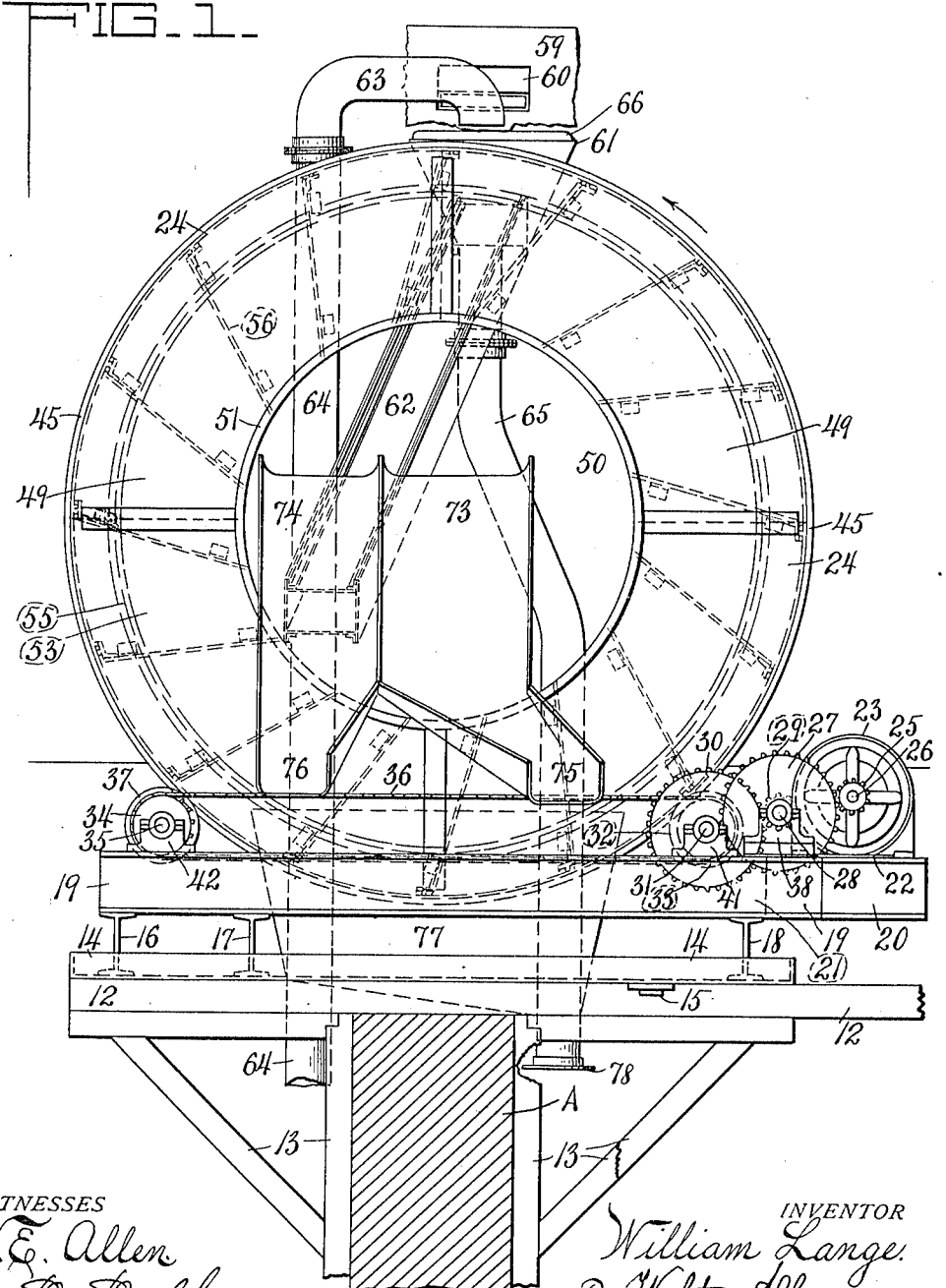

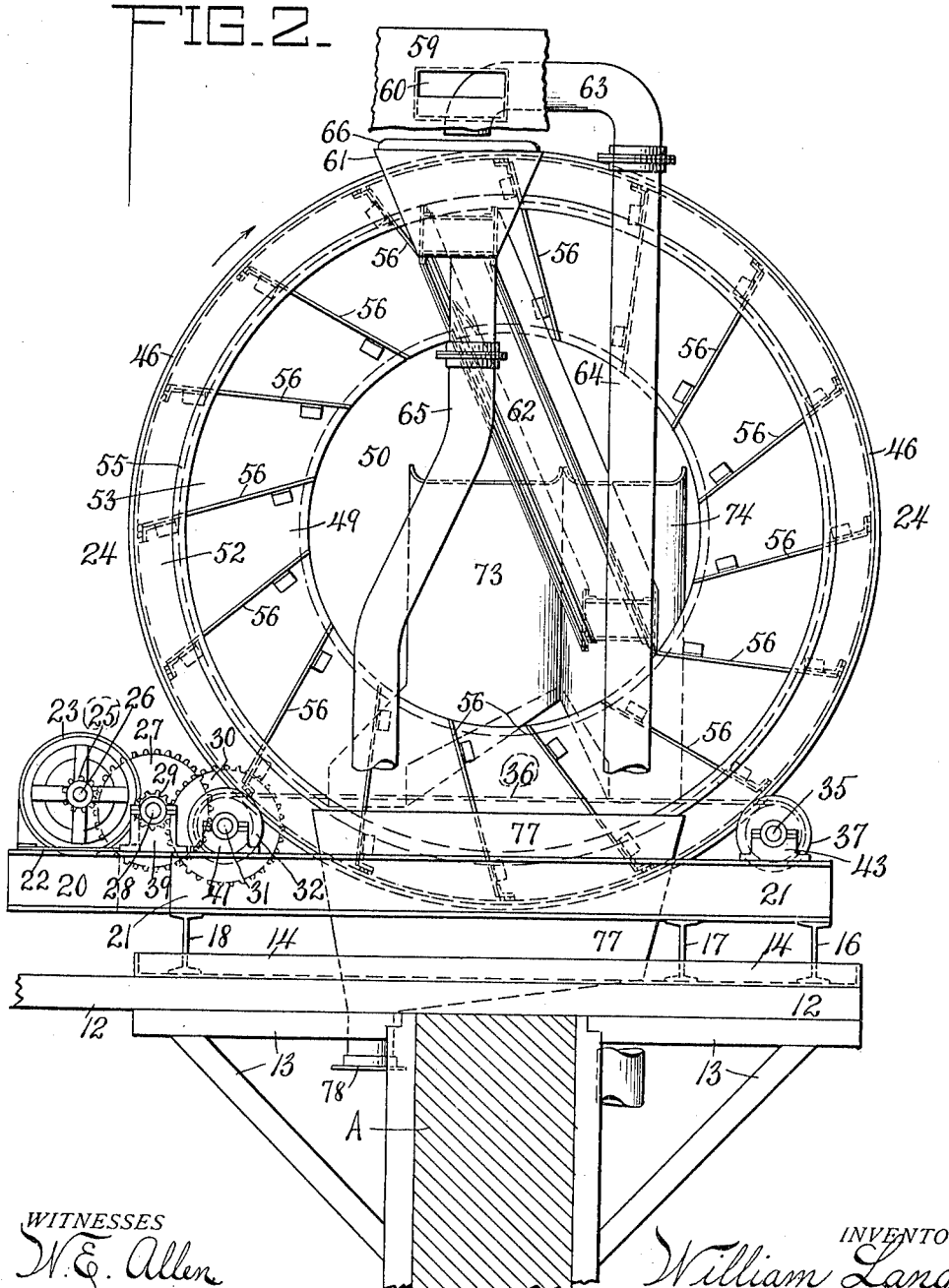

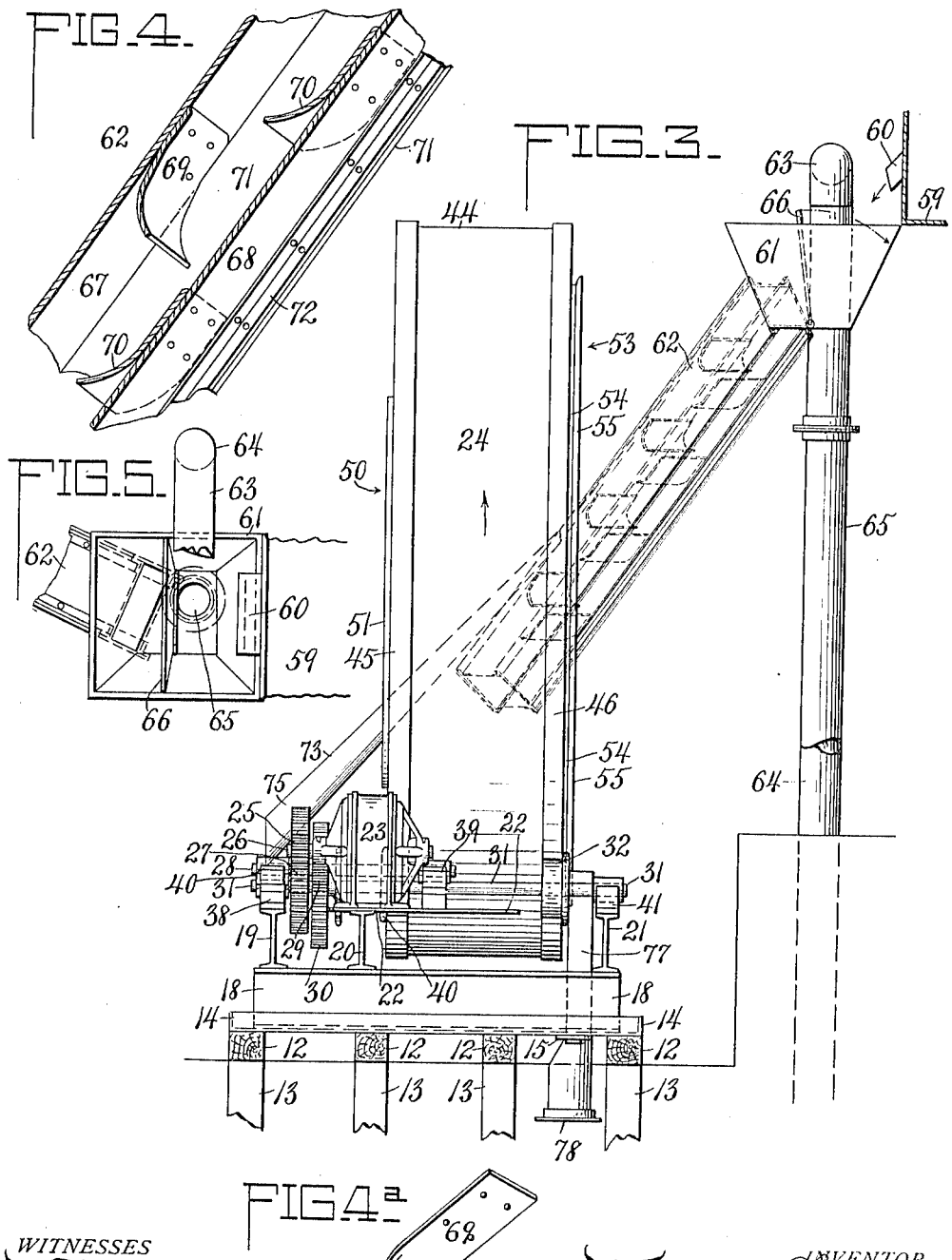

UNITED STATES PATENT OFFICE.

WILLIAM LANGE, OF TOMKINS COVE, NEW YORK, ASSIGNOR OF ONE-HALF TO CALVIN TOMKINS, OF NEW YORK, N. Y.

STONE WASHER AND SEPARATOR.

1,079,132.　　　　　Specification of Letters Patent.　　Patented Nov. 18, 1913.

Application filed April 4, 1913.　Serial No. 758,803.

*To all whom it may concern:*

Be it known that I, WILLIAM LANGE, a citizen of the United States of America, and a resident of Tomkins Cove, in the county of Rockland and State of New York, have invented certain new and useful Improvements in Stone Washers and Separators, of which the following is a description.

My invention relates to the class of washers known as horizontal axis, rotary drum, ore and coal washers and separators, and the object of my invention is to produce a simple and effective machine of this class which will receive a mixture of dirt, earth, stone, gravel, sand and water, will wash the dirt and earth from the remaining solids, separate the stone and gravel from the sand, dirt, earth and water, and screen and deposit the stone and gravel in separate chutes according to size, the sand, dirt, earth and water passing off in such condition that the sand may be secured by passing the mixture over a settling tank, and the dirt, earth and water discharged into a sewer or river.

In the drawings Figure 1 is a front elevation of a washer mounted on a suitable foundation and embodying my invention; Fig. 2 is a rear elevation of the washer and foundation, parts being broken away; Fig. 3 is a side elevation of the washer and foundation, parts being broken away; Fig. 4 is a detail of a portion of the mixing supply chute; Fig. 4ª is a detail of a modified form of baffle plate; Fig. 5 is a detail plan view of the upper end of the mixing supply chute and hopper; Fig. 6 is a detail of a portion of the rear or overflow side of the washing drum; Fig. 7 is a detail of a portion of the front or discharge side of the washer drum; Fig. 8 is a diagrammatic plan of the preferred form of screening plate or tray; Fig. 9 is a detail of a portion of the same; Fig. 10 is a plan view of the means for supporting and rotating the washer drum, and Fig. 11 is an edge view of a modified form of screening plate or tray and securing brackets.

A is a suitable foundation, preferably narrow and slightly elevated above the surrounding ground, and 12 is a series of horizontal supporting ties laid across the foundation and secured against tipping by brackets 13. Upon the series of ties 12 is laid a splash pan 14, which is provided with an escape or waste opening 15 as shown in Fig. 10. Upon the splash pan 14 is laid a series of lower supporting I-beams 16, 17 and 18 and upon the lower supporting I-beams is laid a series of upper supporting I-beams 19, 20 and 21, the two sets of I-beams being suitably secured in place.

A small platform 22 is mounted on I-beam 20 at the right hand end of the machine as viewed in Fig. 1, and upon this platform is mounted a motor 23 for driving the washer drum 24, an electric motor being shown in the present instance. To harmonize the speed of the motor with that desired for the washer drum there are provided reducing gear 25, mounted on and rotated by the motor shaft 26, gear 27 mounted on counter shaft 28 and driving gear 29 fixed to the counter shaft 28, gear 30 driven by gear 29 and mounted on and rotating the rear shaft 31, flanged friction gear driving rollers 32 also mounted on the rear shaft 31 and rotated thereby, sprocket wheel 33 mounted on and driven by the rear shaft 31, sprocket wheel 34 mounted on the forward shaft 35 and driven by sprocket wheel 33 by means of a connecting sprocket chain or belt 36, and rotating the forward shaft 35, and flanged friction gear driving rollers 37 also mounted on the forward shaft 35 and rotated by said forward shaft, the washer drum being driven by frictional contact between it and the pairs of rear and forward friction rollers 32 and 37 respectively in the direction indicated by arrows in Figs. 1, 2 and 3. The motor shaft 26 is supported by the motor casing, the countershaft 28 is mounted in bearings 38 on I-beam 19 and 39 on platform 22, the rear shaft 31 is mounted in bearing 40 on I-beam 20 and 41 on I-beam 21 and the forward shaft 35 is mounted in bearings 42 on I-beam 20 and 43 on I-beam 21.

The washer drum comprises a large cylinder 44 having secured therearound a front peripheral friction band 45 and a rear peripheral friction band 46 adapted to contact with the friction gear driving rollers 32 and 37, a front internal annular right angle bracket 47 see Fig. 7 secured to the cylinder 44 and the band 45, a rear internal annular right angle bracket 48 see Fig. 6 secured to the cylinder 44 and band 46, a wide front face plate 49 secured to the bracket 47 and having a restricted axial exit orifice 50 surrounded by an annular stiffening ring 51, a narrow rear face plate 52 secured to the bracket 48 and having a larger axial entrance orifice 53 surrounded by an annular offsetting and stiffening ring 54 carrying an annular guard flange 55.

Within the washer drum 24 are bracketed a number of screening plates or trays 56, extending inwardly, but not radially, from the cylinder 44, to the edge of the exit orifice 50 in the front face plate, each tray extending inwardly and forwardly, toward the direction of rotation, of a radial line passing through its outer extremity, being perforated, preferably with elongated slots 57 of a size varying with the size of the matter to be treated, and being turned up or flanged at their free edges as shown at 58 in Fig. 11, if desired, in order to better retain the finer particles until the proper position for discharging them is reached in the course of the rotation of the washer drum.

To the rear of the washer drum is suitably mounted a trough or conduit 59 having an outlet or gate 60 and feeding into a hopper 61 formed preferably with downwardly converging sides and having leading therefrom an inclined mixing supply chute 62 which passes through the axial entrance orifice 53 and extends within the washer drum to a point below and to the left side of its axis. A pivoted upper section 63 of an upwardly extending water pipe 64 overhangs and feeds into the hopper 61 and a downwardly extending waste pipe 65 leads away from the bottom of the hopper. A horizontally pivoted partition 66 divides the hopper into forward and rearward portions and enables matter delivered from either or both of the inlets to be delivered into either of the outlets. The inclined mixing supply chute 62, shown as rectangular in cross section in the present instance and comprising top and bottom pieces 67 and 68 respectively having secured thereto a number of baffles 69 and 70, and side pieces 71, the whole being bracketed together with angle pieces 72, is essentially to receive matter from the hopper 61 and discharge it at the proper point within the washer drum 24 and thoroughly mix the matter as it passes through the mixing supply chute. The shape of the cross section of this chute is immaterial except that for convenience in construction the rectangular form is preferred. The baffle plates may be plain or corrugated. If corrugated they have a tendency to divide up the material passing thereover. Wide shallow delivery chutes 73 and 74 lead from within the washer drum, downwardly through the exit orifice 50 in the front face plate 49 and merge into narrow deep spouts 75 and 76 at points beyond the driving machinery where they may be connected to any suitable conveying means. Beneath the annular guard flange 55 surrounding the rear or entrance orifice 53 is a long narrow catch trough 77 converging downwardly into a waste pipe 78 which may lead the water and other matter overflowing the rim of the entrance orifice to a settling tank, sewer or means of disposal.

In operation, the washer drum having been set in motion, and the partition 66 having been set back against the rear wall of the hopper 61, water is let up through water pipe 64, passes from the overhanging section 63 into the hopper 61, down through the mixing supply chute 62 into the washer drum, fills up the washer drum to the level of the entrance orifice 53, runs over and through several screening plates or trays 56, and is in turn churned up by the passage of screening plates or trays through the water in the bottom of the washer drum, overflows the rim of the entrance orifice, stiffening ring 54 and annular guard flange 55, passes into the catch trough 77 and escapes through pipe 78 into the sewer or other place of disposal. The gate 60 being opened, wet or dry material may be discharged from the conduit 59 into the hopper 61, where it will become mixed with the inflowing water from the pipe 64 and pass through the mixing supply chute 62 onto the screening plates or trays 56 as they move beneath the outlet of the chute, be carried through the water in the bottom of the washer drum, the dirt being thus washed out and passing over the rim of the entrance orifice 53 with the escaping water, the solids with some water being swept onto the next succeeding screening plate or tray and carried upward to a point near the top of the washer drum where the coarser matter will roll and slide from the screening plate or tray the fine particles passing through the screening plates into the fine outlet 73 and the coarser particles passing into the coarse outlet 74, by the action of gravity, the speed of the drum being regulated to cause a throw of sufficient force to make this possible. It will therefore be apparent that the inclined delivery chutes extending into the drum intercept different portions of the path of the materials sliding off the screening plates. As the screening plates or trays move upward the water and some fine sand drain back through the perforations in the screening plates or trays and return to the bottom of the washer drum to escape with the water over the edge of the entrance orifice as before explained, or be again carried up.

When it is desired to stop the operation of the machine the gate 60 may be closed and the partition thrown to its forward position whereupon the water supply will be diverted through the outlet pipe 65 to the sewer making it unnecessary to shut off the water each time the washer drum has to be examined or stopped.

By the operation of the machine a mixture of matter may be separated as follows: The water, earth, dirt, and sand pass into the pipe 78 and thence to a settling tank to drop the sand, the residue comprising the water, earth and dirt passing on; the gravel and fine stone into the fine outlet 73; and the coarser gravel and coarser stone into the coarse outlet 74.

The machine is intended primarily to be used for separating the smaller sizes of gravel and stone which cannot be successfully separated by the usual dry methods and which have to be thrown away because of their unfitness for engineering purposes. The matter passing through the screen and into the fine outlet is composed largely of pieces scarcely larger than a pin head, while the matter passing into the coarse outlet and not through the screen is composed largely of matter approximating one-quarter inch in diameter and below the size ordinarily sold for use in concrete work. A mixture of the two is too large to be used as sand in building purposes and too small to be used as broken stone, and invariably has with it a proportion of fine powder and earthy matter which is objectionable for construction purposes. The present invention separates this formerly waste product into at least two grades having commercial value and cleanses the third grade so that it may be recovered in a condition also fit for use.

In the operation of the machine the tendency of the material is to settle toward the periphery end of the plates or trays until above 45 degree inclination of the plates or trays is attained about which time the material starts to roll toward the center of the drum, the screening operation being performed as it rolls, the finer particles falling through the perforations in the screen and dropping into the nearer outlet which is the fine outlet and the coarser particles having to roll to the inner edge of the plates before being free to drop leave the plates at a time when they are passing over the farther or coarse outlet.

Such of the finer particles as may pass through the perforations in the screening plates prior to the time when the screening plate which they are leaving is above the fine outlet drop back into the washer drum to be again picked up. Most of the water drains off or from the solids before the material begins to roll on the plates and the little that remains and passes into the fine and coarse outlets is easily diverted from the solids passing into the same outlets. The discharge or delivery chutes 73 and 74 may be mounted in any suitable manner.

The machine is preferably mounted on a narrow foundation so that the water and waste pipes may be accommodated without cutting into the foundation.

Having thus described my invention the following is what I claim as new therein and desire to secure by Letters Patent:

1. A stone washer and separator comprising a drum consisting of a cylinder, a front face plate having an axial exit orifice, a rear face plate having an axial entrance orifice, and non-radial screening plates secured between the front and rear face plates and extending in an inclined position between the inner wall of the cylinder and the exit orifice, feeding means, inclined delivery chutes extending into the drum and intercepting different portions of the path of materials sliding off the screening plates and means for supporting and rotating the drum.

2. A stone washer and separator comprising a drum consisting of a cylinder, a front face plate having an axial exit orifice, a rear face plate having an axial entrance orifice, and non-radial screening plates secured between the front and rear face plates and extending in an inclined position between the inner wall of the cylinder and the exit orifice, feeding means extending into the entrance orifice, inclined toward the front face plate and discharging onto the lower descending screening plates and inclined delivery chutes extending into the drum and intercepting different portions of the path of materials sliding off the screening plates and means for supporting and rotating the drum.

3. A stone washer and separator comprising a drum consisting of a cylinder, a wide front face plate having an axial exit orifice, a narrow rear face plate having an axial entrance orifice, and non-radial screening plates secured between the front and rear face plates and extending in an inclined position between the inner wall of the cylinder and the exit orifice, feeding means, inclined delivery chutes extending into the drum and intercepting different portions of the path of the materials sliding off the screening plates and means for supporting and rotating the drum.

4. A washer drum comprising a large cylinder having secured therearound a front peripheral friction band and a rear peripheral friction band, a front internal annular right angle bracket secured to the cylinder and to the front band, a rear internal annular right angle bracket secured to the cylinder and to the rear band, a wide front face plate having a restricted axial exit orifice surrounded by an annular stiffening ring and secured to the front bracket, a narrow rear face plate having a large axial entrance orifice, surrounded by an annular stiffening ring provided with a guard flange and secured to the rear bracket and non-radial screening plates secured between the front and rear face plates and inclined from the inner wall of the cylinder to the edge of the front exit orifice.

WILLIAM LANGE.

Witnesses:
HENRY S. MOORE,
JORDAN TUCKER.

Copies of this patent may be obtained for five cents each, by addressing the "Commissioner of Patents, Washington, D. C."